(12) United States Patent
Schmid et al.

(10) Patent No.: US 10,550,297 B2
(45) Date of Patent: Feb. 4, 2020

(54) PAINT PROTECTION FILMS

(71) Applicant: 3M INNOVATIVE PROPERTIES COMPANY, St. Paul, MN (US)

(72) Inventors: Matthew J. Schmid, Roberts, WI (US); Vijay Rajamani, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 264 days.

(21) Appl. No.: 15/310,492

(22) PCT Filed: May 15, 2015

(86) PCT No.: PCT/US2015/031033
§ 371 (c)(1),
(2) Date: Nov. 11, 2016

(87) PCT Pub. No.: WO2015/175911
PCT Pub. Date: Nov. 19, 2015

(65) Prior Publication Data
US 2017/0073552 A1 Mar. 16, 2017

Related U.S. Application Data

(60) Provisional application No. 61/994,513, filed on May 16, 2014.

(51) Int. Cl.
*C09J 7/02* (2006.01)
*C09J 133/08* (2006.01)
(52) U.S. Cl.
CPC ....... *C09J 133/08* (2013.01); *C09J 2475/006* (2013.01)

(58) Field of Classification Search
CPC ................ C09J 133/08; C09J 2201/622; C09J 2203/306; C09J 2423/006; C09J 2475/006; C09J 7/29; C09J 7/385
(Continued)

(56) References Cited

U.S. PATENT DOCUMENTS

RE24,906 E 12/1960 Ulrich
3,331,729 A 7/1967 Danielson et al.
(Continued)

FOREIGN PATENT DOCUMENTS

EP  1 995 288   11/2008
JP  H09-3420    1/1997
(Continued)

OTHER PUBLICATIONS

PCT International Search Report from PCT/US2015/031033; dated Jul. 22, 2015, 3 pages.

*Primary Examiner* — Thao T Tran
(74) *Attorney, Agent, or Firm* — 3M IPC; Carlos M. Téllez

(57) ABSTRACT

There is provided a transparent paint protection film comprising an acrylic adhesive layer, wherein the acrylic adhesive layer comprises a first cross-linking agent comprising a metal ion and a second cross-linking agent; and a base layer disposed therebetween, wherein the base layer is selected from at least one of polyurethane, polyvinylchloride, polyolefins, and combinations thereof, wherein the transparent paint protection film has a Young's modulus of less than or equal to 200 MPa; and optionally a clear coat disposed along a major surface of the base layer that is opposite the surface that is adhered to the adhesive layer.

19 Claims, 2 Drawing Sheets

(58) Field of Classification Search
USPC .............................. 428/424.4, 518; 526/931
See application file for complete search history.

(56) References Cited

U.S. PATENT DOCUMENTS

| | | |
|---|---|---|
| 4,418,120 A | 11/1983 | Kealy et al. |
| 4,619,867 A | 10/1986 | Charbonneau et al. |
| 4,751,121 A | 6/1988 | Kuehnel et al. |
| 4,835,217 A | 5/1989 | Haskett et al. |
| 5,882,775 A | 3/1999 | Matsui et al. |
| 6,383,644 B2 | 5/2002 | Fuchs |
| 6,607,831 B2 | 8/2003 | Ho et al. |
| 2004/0241352 A1* | 12/2004 | Shih ..................... B41M 5/5272 428/32.38 |
| 2005/0000642 A1* | 1/2005 | Everaerts ............... C09J 7/0242 156/273.1 |
| 2014/0315018 A1* | 10/2014 | Yamagata .............. C09J 7/0246 428/354 |

FOREIGN PATENT DOCUMENTS

| | | |
|---|---|---|
| WO | WO 87/00189 | 1/1987 |
| WO | WO 2011/073041 | 6/2011 |

* cited by examiner

PAINT PROTECTION FILMS

FIELD OF THE INVENTION

Provided are transparent paint protection films. More particularly, the provided transparent paint protection films include a pressure sensitive adhesive having first cross-linking agent having a metal ion and a second cross-linking agent.

BACKGROUND

Paint protection films are adhered to the surfaces of articles having painted surfaces or paint film on surfaces thereof (e.g., painted automobiles and their components or metal plates such as a steel plate and their molding, or the like) in order to protect from surface damage or defects during transportation, storage, aging or construction of such articles. Paint protection film is generally removable from the painted surface or paint film on a surface. Such paint protection film should be removable without leaving residues on the painted surface or paint film after use as a protective means.

Paint protection films useful in these applications typically include a pressure-sensitive adhesive layer on one face of a support substrate. For example, a pressure sensitive adhesive layer useful in a paint protection film for automobile applications includes a polyisobutylene-based pressure sensitive adhesive (Japanese Patent No. 2832565). Japanese Patent Application Publication No. H9-3420 discloses a paint film protection sheet that comprises a support substrate provided with a rubber-based PSA layer containing a highly polar inducer.

Non-crosslinked pressure sensitive adhesives generally tend to have poor cohesive strength and it is difficult to increase initial adhesion of these types of pressure sensitive adhesives when used in paint protection films. Over cross-linked pressure sensitive adhesives can create silvering or other surface defects when used in paint protection films.

There is a need to provide paint protection films having sufficient initial adhesion to facilitate application of the paint protection film to a painted surface or paint film on such surface while avoiding adhesive residue on such surface. There is also a need to provide paint protection films that are able to dissipate initial strains experienced during installation while providing sufficient in use adhesion of the paint protection film to a painted surface or a paint film. There is yet another need to provide paint protection films that do not exhibit silvering or other surface defects once applied to a painted surface or a paint film.

SUMMARY

The presently disclosed paint protection films have sufficient initial adhesion to facilitate application of the paint protection film to a painted surface or paint film on such surface while avoiding adhesive residue on such surface. The presently disclosed paint protection films are able to dissipate initial strains experienced during installation while providing sufficient in use adhesion of the paint protection film to a painted surface or a paint film. The presently disclosed paint protection films do not exhibit silvering or other surface defects once applied to a painted surface or a paint film.

In one aspect, the present disclosure provides a transparent paint protection film comprising: a transparent polymeric base layer backed by a transparent acrylic adhesive layer, wherein the acrylic adhesive layer comprises a first cross-linking agent and a second cross-linking agent different from the first cross-linking agent, wherein the first cross-linking agent comprising a metal ion, and the base layer comprising a polyurethane, polyvinylchloride, polyolefin, or any combination thereof, and further wherein the transparent paint protection film has a Young's modulus of less than or equal to 200 MPa.

In some embodiments, the paint protection film has a Young's modulus of the transparent paint protection film of less than or equal to 120 MPa. In some embodiments, the transparent paint protection film has a Young's modulus of greater than or equal to 10 MPa.

In some embodiments, the first cross-linking agent in the adhesive layer of the transparent paint protection film is metal ion of is an aluminum ion, titanium ion, or a combination thereof. In some embodiments, the second cross-linking agent in the adhesive layer of the transparent paint protection comprises aziridine, isocyanate, peroxide, or any combination thereof.

In some embodiments, the base layer has a thickness in the range of from at least about 100 microns up to and including about 400 microns. In some embodiments, the base layer comprises an aliphatic thermoplastic polyurethane.

In some embodiments, adhesive layer has a percent strain of less than or equal to 1.0 according to the Creep Test described below. In some embodiments, the base layer is polyurethane and the acrylic adhesive layer has a 180 degree peel adhesion in the range of from at least about 300 N/m up to and including about 1300 N/m according to the Peel Adhesion Test described below for a 1 hour duration. In some embodiments, the base layer is polyurethane and the acrylic adhesive layer has a 180 degree peel adhesion in the range of from at least about 500 N/m up to and including about 1000 N/m according to the Peel Adhesion test performed for a 1 hour duration. In some embodiments, the base layer is polyurethane and the acrylic adhesive has 180 degree peel adhesion in the range of from at least about 300 N/m up to and including about 1500 N/m according to the Peel Adhesion test performed for a 168 hour duration.

In another aspect, the present disclosure provides a transparent clear coat layer disposed on a major surface of the base layer that is opposite the surface adhered to the adhesive layer.

The above summary is not intended to describe each embodiment or every implementation of the reservoirs and associated vent assemblies described herein. Instead, a more complete understanding of the invention will become apparent and appreciated by reference to the following Detailed Description and Claims in view of the accompanying drawings.

DEFINITIONS

Figure 1:
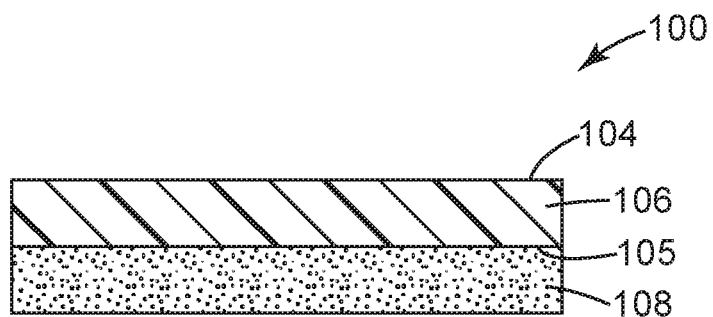
FIGS. 1-3 show cross-sectional elevational views of transparent paint protection films according to various embodiments.

As used herein:

"ambient conditions" means at a temperature of 25 degrees Celsius and a pressure of 1 atmosphere (approximately 100 kilopascals);

"catalyst" means a substance that can increase the speed of a chemical reaction;

"diol" means a compound having a hydroxyl functionality of exactly two;

"diisocyanate" means a compound having an isocyanate functionality of exactly two;

"harden" means to alter the physical state and or chemical state of the composition to make it transform from a fluid to less fluid state, to go from a tacky to a non-tacky state, to go from a soluble to insoluble state, to decrease the amount of polymerizable material by its consumption in a chemical reaction, or go from a material with a specific molecular weight to a higher molecular weight;

"hardenable" means capable of being hardened. "polyisocyanate" means a compound having an isocyanate functionality of two or more;

"polyol" means a compound having a hydroxyl functionality of two or more; and

"primary isocyanate" means a carbon atom upon which the isocyanate group is attached also has two hydrogen atoms.

"transparent" means having the property of transmitting rays of light through its substance so that bodies situated beyond or behind can be distinctly seen.

"transparent acrylic adhesive layer" is herein used interchangeably with the phrase "adhesive layer".

"transparent paint protection film" is herein used interchangeably with the phrase "paint protection film".

"transparent polymeric base layer" is herein used interchangeably with the phrase "base layer".

DETAILED DESCRIPTION

As used herein, the terms "preferred" and "preferably" refer to embodiments described herein that may afford certain benefits under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

Relative terms such as left, right, forward, rearward, top, bottom, side, upper, lower, horizontal, vertical, and the like may be used herein and, if so, are from the perspective observed in the particular figure. These terms are used only to simplify the description, however, and not to limit the scope of the invention in any way. Figures are not necessarily to scale.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Layer Constructions and Compositions

A paint protection film according to some embodiments is illustrated in FIG. 1 and designated by the numeral 100. The paint protection film 100 includes a base layer 106 having a top surface 104 and a bottom surface 105. Extending along the bottom surface 105 of the base layer 106 is an adhesive layer 108 that contacts the base layer 106 along essentially the entire bottom surface 105. Preferably, the base layer 106 is adhered to the adhesive layer 108.

In a preferred embodiment, the adhesive layer 108 is a pressure sensitive adhesive that is normally tacky at ambient conditions. In some embodiments, useful pressure sensitive adhesives include polyacrylate-based adhesives, which can display advantageous properties as high degrees of clarity, UV-stability and aging resistance. Polyacrylate adhesives that are suitable for protective film applications are described, for example, in U.S. Pat. No. 4,418,120 (Kealy et al.); RE24,906 (Ulrich); U.S. Pat. No. 4,619,867 (Charbonneau et al.); U.S. Pat. No. 4,835,217 (Haskett et al.); and International Publication No. WO 87/00189 (Bonk et al.).

Adhesives useful in the present disclosure are used with a crosslinker. Preferably, the polyacrylate pressure sensitive adhesive comprises a crosslinkable copolymer of a C4-C12 alkylacrylate and an acrylic acid. Useful crosslinking reactions include chemical crosslinking and ionic crosslinking. In some embodiments, the chemical crosslinker may include polyaziridine and/or bisamide and the ionic crosslinker may include metal ions of aluminum, zinc, zirconium, or a mixture thereof. A mixture of chemical crosslinker and ionic crosslinker can also be used.

In some embodiments, the pressure sensitive adhesive has a first cross-linking agent comprising a metal ion and a second cross-linking agent. As a cross-linking agent, isocyanate compounds, epoxy compounds, aziridine compounds or metal chelate compounds can be used, and among these compounds, isocyanate compounds are preferred.

Particularly, the isocyanate compound can be selected from a group including toluene diisocyanate, xylene diisocyanate, diphenylmethylene diisocyanate, hexamethylene diisocyanate, isoform diisocyanate, tetramethylxylene diisocyanate, naphthalene diisocyanate, and their reactants with polyol, such as trimethylol propane.

The epoxy compound can be selected from a group including ethyleneglycol diglycidylether, triglycidylether, trimethylolpropane triglycidylether, N,N,N',N'-tetraglycidyl ethylenediamine and glycerine diglycidyl ether.

The aziridine compound can be selected from a group including N,N'-toluene-2,4-bis(1-aziridine carboxide), N,N'-diphenylmethne-4,4'-bis(1-aziridine carboxide), triethylenemelanin, bisisoprothaloyl-1-(2-methylaziridine) and tri-1-aziridinyl phosphineoxide.

Any compound in which a polyvalent metal such as aluminum, iron, zinc, tin, titanium, antimony, magnesium and vanadium is coordinated in acetylacetone or acetoacetateethyl can be used as the metal chelate compound.

The preferable content of a cross-linking agent in 100 weight parts of a polyacrylate pressure sensitive adhesive in the adhesive layer is 0.0110 weight parts. If the content is less than 0.01 weight parts, the cohesive strength will be decreased and so will durability. On the contrary, if the content is more than 10 weight parts, the adhesive property will be reduced, and thus wettability of the adherend will be reduced.

In some embodiments, the polyacrylate pressure sensitive adhesive includes a tackifier such as rosin ester. Adhesives useful in the invention may also contain additives such as light stabilizers, oligomeric species, plasticizers, as long as they are provided in an amount that does not unduly degrade the quality of the adhesive bond to the surface.

Generally, the adhesive layer 108 is provided at a thickness ranging from 25 to 250 micrometers. For certain applications, such as applying the paint protection film 200 to an automotive exterior, it may be desirable for the adhesive to be repositionable, at least initially, so that the sheet can be adjusted to fit at a desired place before a permanent bond is formed. Such repositionability may be achieved by providing, for example, a layer of minute glass bubbles on the adhesive surface as disclosed in U.S. Pat. No. 3,331,729 (Danielson et al.).

While the base layer 106 is depicted here as a flat sheet, it may take on any of a number of different shapes. For example, the base layer 106 may have three-dimensional contours that include regions of positive and/or negative curvature. Exemplary base layers include sheets, decorative articles, graphics, and the like. Even if the base layer 106 is formed as a flat sheet, it can be subsequently die-cut, thermoformed, embossed, debossed, or otherwise formed into a shape different from its original shape. In some embodiments, the base layer 106 is any polymer capable of being stretched over a given substrate to be protected, such as an aliphatic thermoplastic polyurethane or polyvinylchloride. Optionally, a separate adhesive or mechanical device may be used to fasten the base layer 106 to the substrate.

The base layer 106 can be obtained by hardening two-part hardenable compositions as described below for the clear coat layer 202 or from any other synthetic method. The synthesis and polymer processing of the base layer 106 can be conducted jointly or in discrete steps.

In exemplary embodiments, the base layer 106 is made from a polyurethane, polyester and/or polyolefin such polypropylene, polyethylene and blends of polyethylene and polypropylene, ethylene modified copolymers such as ethylene-vinylacetate, ethylene-(meth)acrylic acid, ethylene-methacrylate and blends thereof. Compositions yielding particularly desirable properties in a paint protection film for protecting the exterior surface of an automobile include ionomers of olefin/vinyl carboxylate copolymers such as ethylene-acrylic acid and ethylene-methacrylic acid copolymers combined with various metal cations including cations of lithium, sodium, potassium, zinc, aluminum and calcium. Suitable commercial ionomer resins include materials available from E.I. DuPont de Nemours & Co. of Wilmington, Del. under the trade name SURLYN.

In a preferred embodiment, the base layer 106 is an aliphatic thermoplastic polyurethane, which can provide excellent optical characteristics, high flexibility, good heat and UV resistance, and good gravel resistance (or chip resistance). In some embodiments, the base layer is greater than or equal to 100 microns thick and less than or equal to 400 microns thick.

Any of a number of known conventional coating techniques may be used to coat the hardenable coating composition on the base layer 106. Examples of useful coating techniques include Meyer bar coating, spray coating, screen printing, rotary screen coating, as well as direct gravure coating, reverse gravure coating, die coating and offset gravure coating. Optionally, these techniques may be used in coating any of the other layers in the transparent paint protection films herein disclosed.

Figure 2:
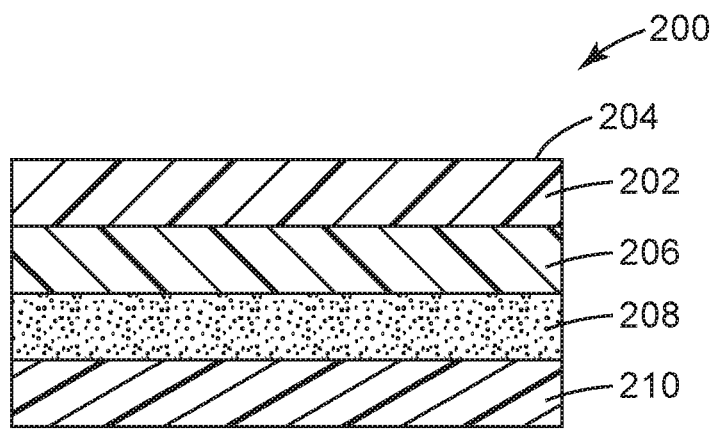

FIG. 2 shows a paint protection film 200 according to a second embodiment having a clear coat layer 202 and base layer 206 that are essentially analogous to those of FIG. 1 and further including an adhesive layer 208 and adhesive liner 210. As shown, the adhesive layer 208 extends across and contacts a major surface of the base layer 206 opposite the side contacting the clear coat layer 202. Therefore, in some embodiments, the base layer 206 is interposed between the clear coat layer 202 and the adhesive layer 208. On the bottom surface of the paint protection film 200, the adhesive layer 208 is protected by the release liner 210, which extends across and contacts the adhesive layer 208, which is thus interposed between the base layer 206 and the release liner 210.

The clear coat layer 202 is formed from a hardenable composition whose components react together to afford a hardened composition. In exemplary embodiments, the hardenable composition includes a polyol, a polyisocyanate, and a monohydroxyl acrylic polydimethylsiloxane. Hardening takes place through catalyzing the polymerization of the components of the hardenable composition into a crosslinked network.

The crosslink density of a polyurethane is calculated by dividing the weight of the reaction components having a functionality of three or greater by the total weight of the polyurethane and multiplying by 100. High crosslink densities, for example exceeding 30 percent, are generally associated with rigid polyurethane materials. Use of a primary aliphatic polyisocyanate, however, can enable polyurethanes that are both flexible and have a high crosslink density. When the polyisocyanate content of the second reaction component is about 50 weight percent or greater, crosslink densities can be at least 25 percent, at least 26 percent, at least 27 percent, at least 28 percent, at least 29 percent, at least 30 percent, at least 31 percent, at least 32 percent, at least 33 percent, at least 34 percent, at least 35 percent, at least 36 percent, at least 37 percent, at least 38 percent, at least 39 percent, or at least 40 percent.

In some embodiments, the clear coat layer 202 is made from a two-part hardenable composition, in which a first part and a second part are mixed together some time before hardening to produce the final polyurethane article. In one exemplary two-part composition, the first part includes the polyisocyanate, while the second part includes a mixture of the polyol, monohydroxyl polydimethylsiloxane, and a suitable catalyst. One or both of the first and second parts may be diluted in a suitable solvent or provided in solventless form. Preferably, both the first and second parts are liquids at ambient temperature and pressure.

Where used, a solvent can assist in adjusting the viscosities of the first and/or second part of the two-part hardenable composition. Such solvents include, for example, ether acetate, acetate, ketone, benzene derivatives, and mixtures thereof. There is no particular restriction on the amount of solvent used, although it is preferable that the amount is sufficient to facilitate adequate mixing of the first and second parts with each other while also capable of being evaporated prior to hardening the clear coat layer 202. Such evaporation could be facilitated by heat, vacuum, or both.

Various components of the hardenable composition comprising the clear coat layer 202 are further described below. It is to be understood that this description is not exhaustive and that additional components may optionally be included in the hardenable compositions described herein. It is further noted that the hardenable compositions need not be limited to the clear coat layer 202.

First, the provided hardenable polyurethane compositions include a polyol. In polyurethane synthesis, the hydroxyl (—OH) groups of the polyol react with the functional groups of the isocyanate component, generally in the presence of a suitable catalyst. Suitable polyols include polyester compositions, polyacrylic compositions, polyether compositions, polycarbonate compositions, polyalkylene compositions, caprolactone compositions, polyolefin compositions, and mixtures thereof. Particularly preferred polyols include caprolactone polyol, polycarbonate polyol, a polyester polyol, acrylic polyol, polyether polyol, polyolefin polyol, and mixtures thereof.

Typical molecular weights of polyols useful for the provided embodiments generally range from 28 to 6000 g/mol. Diols and polyols having molecular weights outside of the above range, however, may also be usable in these hardenable compositions.

Suitable polyols are commercially available from various sources. Polyols are available from Bayer Corporation of Pittsburgh, Pa. under the trade name DESMOPHEN and MULTRANOL, Crompton Corporation of Greenwich, Conn. under the trade name FORMREZ, BASF Corporation of Ludwigshafen, Germany under the trade name JON-CRYL or PLURACOL, Dow Chemical Company of Midland, Mich. under the trade name ACRYLOID, Perstorp of Perstorp, Sweden under the trade name CAPA, Kuraray Company, Ltd. of Tokyo, Japan, Dupont Company of Wilmington, Del. under the trade name TERATHANE, COIM USA Inc, West Deptford, N.J. under the trade name DIEXTER, King Industries Specialty Chemicals of Norwalk, Conn. under the trade name K-FLEX, Cray Valley USA of Exton, Pa. under the trade names POLY BD and KRASOL, and Stepen Company of Northfield, Ill. under the trade name STEPANOL, and Hall Star Company of Chicago, Ill., under the trade name URETI-IHALL.

Second, the provided hardenable compositions include a suitable polyisocyanate, characterized by two or more isocyanate functional groups having the chemical formula —N=C=O. The polyisocyanate may be aliphatic or aromatic, and further may be primary, secondary, tertiary, or a mixture thereof. In preferred embodiments, however, the polyisocyanate component is a primary polyisocyanate. It was discovered that the molecular structure of a primary polyisocyanate substantially enhances the ability of silicone functional groups to migrate to the free surface of the composition. Facile migration of these functional groups, in turn, decreases the surface energy of the hardened composition, creating an easy cleaning surface that tends to repel contaminants.

Secondary polyisocyanates and polyisocyanates with higher functionality did not display the beneficial properties observed with primary polyisocyanates. Without wishing to be bound by theory, it is assumed that higher order polyisocyanates may be affected by substantial steric or chain/ring strain effects that retard mobility of the silicone groups even when these groups are disposed at the ends of the polymer chains.

Primary polyisocyanates can be made from primary diisocyanates. Particularly suited primary diisocyanates for synthesizing primary polyisocyanates include, but are not limited to, 1,6-hexamethylene diisocyanate, trimethyl-hexamethylene diisocyanate, 1,4-tetramethylene diisoycanate, 1,3-xylene diisocyanate, 1,4-xylene diisocyanate, 1,12-decamethylene diisocyanate, 2-methylpentamethylene diisocyanate, or 1,4-cyclohexane dimethylene diisocyanate.

The polyisocyanate selected often affects the durability of the resulting polyurethane. For articles which require outdoor weatherability, aliphatic polyisocyanates are generally preferred. For a flexible sheet material to be used for vacuum thermoforming into three dimensional articles, a suitable primary polyisocyanate could be, for example, a biuret or an isocyanurate.

Third, the provided hardenable compositions include a monofunctional silicone component, such as a monohydroxyl polydimethylsiloxane. In a preferred embodiment, the polydimethylsiloxane is an acrylic polydimethylsiloxane, in which the polydimethylsiloxane is a side chain branching from an acrylic backbone. Because this silicone component has a functionality of one, it acts as a chain terminating agent during polymerization of the clear coat composition.

The amount of monohydroxyl acrylic polydimethylsiloxane was found to have bearing on certain properties of the clear coat, such as clarity, UV light resistance and heat aging performance. As later reported in the Examples, adding over 5 weight percent monohydroxyl acrylic polydimethylsiloxane relative to the overall weight of the hardenable composition yielded paint protection films having degrees of haze unacceptable for clear coat applications.

Preferably, the amount of monohydroxyl acrylic polydimethylsiloxane is sufficient to impart acceptable low surface energy and easy cleaning properties to the resulting clear coat layer 202 without unduly compromising its optical properties. In exemplary embodiments, the monohydroxyl acrylic polydimethylsiloxane is present in an amount of at least 0.1 weight percent, at least 0.3 weight percent, or at least 0.5 weight percent, based on the overall weight of the hardenable composition. Preferably, the monohydroxyl acrylic polydimethylsiloxane is present in an amount of at most 6 weight percent, at most 5 weight percent, or at most 4 weight percent, based on the overall weight of the hardenable composition. It is believed that the concentration of the polydimethylsiloxane functional groups is greater at the surface of the clear coat layer 204 than in the bulk of the clear coat layer 202, thereby providing the enhanced "dry erase" cleaning properties observed.

In some embodiments, the hardenable composition contains monohydroxyl acrylic polydimethylsiloxane present in an amount ranging from 0.1 weight percent, and in increments of 0.1 weight percent (i.e., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0), up to and including 5.0 weight percent, and any range therebetween (e.g., 0.5 to 5.0 weight percent, 0.5 to 4.5 weight percent, 0.7 to 4.8 weight percent, etc.), relative to the overall weight of the hardenable composition.

The hardenable composition preferably includes a catalyst in combination with the polyol and the isocyanate components in order to facilitate reaction between the components. Conventional catalysts generally recognized for use in the polymerization of polyurethanes can be suitable for use with the present invention. For example, aluminum, bismuth, tin, vanadium, zinc, zirconium based catalysts, amine catalysts, or mixtures thereof may be used. Although less preferred, mercury based catalysts may also be used. Preferred catalysts include tin based catalysts, such as dibutyl tin compounds. Particularly preferred are catalysts selected from the group consisting of dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, and dibutyltin oxide. The catalyst is preferably included at levels of at least 10 parts per million parts (ppm) based on the total solution weight in the first component, and more preferably at least 25 ppm or greater.

The hardenable composition may include other additives conventionally used in protective polymeric coatings. These additives may include, for example, an anti-oxidant or an UV radiation stabilizer. The hardenable composition can also be pigmented if a tinting of the clear coat layer 202 is desired. Although inorganic or organic pigments can degrade the optical and mechanical properties of the polyurethane layer, small amounts can be added to the polyurethane while still achieving acceptable weatherability, chemical, and heat resistance as well as a good abrasion and scratch resistance.

Particularly preferred coloring agents are pigments and dyes. Dyes and pigments suitable for the addition to the polyurethane layer may be in the form of a paste. Commercially available pigments that can be used in the polyurethane layer of this invention include pigments available from ISL Chemie GmbH of Kürten, Germany under the trade name ISOVERSAL and BASF of Ludwigshafen, Germany under the trade name LUCONYL. Typically, dye colorants can be added to the polyurethane layer in an amount of 0.5 pph (parts per hundred) up to 10 pph without unacceptably compromising the beneficial properties of the polyurethane.

Referring again to FIG. 2, the base layer 206 essentially serves as a backing for the clear coat layer 202.

Optionally, the release liner 210 functions as a carrier film that is discarded when the paint protection film 200 is used. For example, in a typical end user application of the paint protection film 200, the release liner 210 can be peeled away from the adhesive layer 208, and then the clear coat layer 202, base layer 206, and adhesive layer 208 collectively spread over and pressed down against the substrate to be protected.

Although not illustrated here, the release liner 210 may be omitted from the construction shown in FIG. 2. If so, the paint protection film 200 could be rolled upon itself for storage whereby the clear coat layer 202 itself protects the adhesive layer 208 while also functioning as a release liner. In this embodiment, the adhesion between the adhesive layer 208 and clear coat layer 202 can be tailored to sufficiently hold the roll together and yet allow the paint protection film 200 to be easily dispensed by unwinding the roll.

Figure 3:
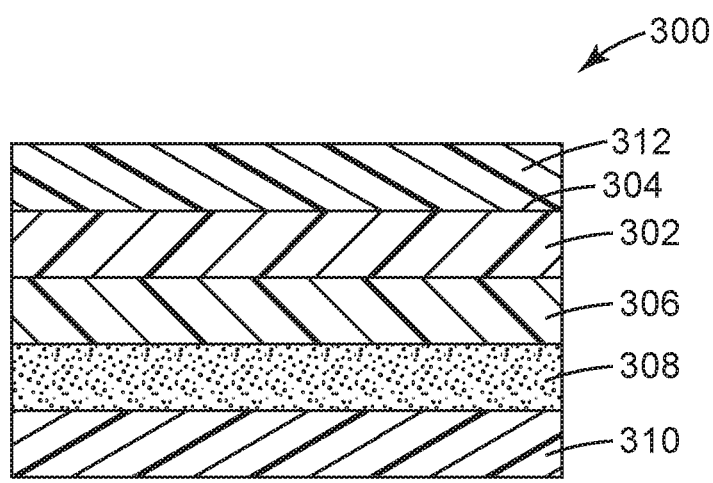

FIG. 3 shows a paint protection film 300 according to still another embodiment that shares many aspects of the paint protection films 100, 200 described above. The paint protection film 300 includes a clear coat layer 302, base layer 306, an adhesive layer 308 and release liner 310. The paint protection 300 further includes, however, a clear coat liner 312 that extends over and contacts a top surface 304 of the clear coat layer 302 such that the clear coat layer 302 is interposed between the clear coat liner 312 and the base layer 306.

The clear coat liner 312, which may also act as a carrier film for the paint protection film 300, protects the outward-facing surface of the clear coat layer 302 during the manufacture, packaging, storage, and dispensing of the paint protection film 300. The clear coat liner 312 is typically laminated to the top surface 304 of the clear coat layer 302 and then stripped off after the clear coat layer 302 is essentially fully cured. In some applications, the clear coat liner 312 can remain in contact with the clear coat layer 302 until the protected article is ready to be transferred to the end user. In another application, the clear coat liner 312 may be stripped off of the clear coat layer 302 prior to a forming process such as vacuum thermoforming.

There are no particular restrictions on the material used for the clear coat liner 312, although it is preferable that the clear coat liner 312 does not readily slide along the clear coat layer 302 and yet easily peels away from the clear coat layer 302. Exemplary materials usable for clear coat liner 312 include polyethylene terephthalate, polyolefin, modified polyolefin, and mixtures thereof.

In typical embodiments, the top surface 304 of the clear coat layer 302 is smooth, resulting in a glossy appearance. In certain applications, it may be desired for the paint protection film 300 to have a matte finish. This can be achieved by providing a clear coat liner 312 that has a roughened texture, which is pressed against the clear coat layer 302 to replicate the texture before it is fully hardened. The clear coat liner 312 can then be subsequently peeled away to produce a clear coat layer 302 having a roughened surface with reduced gloss.

With respect to any of the paint protection films 100, 200, 300, one or more additional layers may be coated or laminated to either major surface of the paint protection film 100, 200, 300 or, alternatively, interposed between any two adjacent layers present in the paint protection film 100, 200, 300. Such layer or layers may be similar to those already described or may be structurally or chemically distinct. Distinct layers could include, for example, extruded sheets, metal vapor coatings, printed graphics, particles, and primers, and may be continuous or discontinuous. For example, an additional tie layer may be disposed between the base layer 106, 206, 306 and the adhesive layer 108, 208, 308 to improve the quality of adhesion between the adhesive and base layers.

If desired, the base layer 106 of the paint protection film 100 could be laminated onto a substrate, such as a vehicular body panel. Alternatively, the base layer 106 could be provided in a configuration where it is already adhered or otherwise coupled to the substrate.

One or more additional layers could be permanently or temporarily disposed on the top surface 104, 204, 304 of the clear coat layer 202, 302. For instance, the clear coat layer may itself comprise multiple clear coat layers. Like the clear coat layer 202, 302, any of the other layers described herein could be pigmented to alter the outward appearance of the paint protection film.

Other features, options and advantages related to the paint protection films 100, 200, 300 are further described in U.S. Pat. No. 6,607,831 (Ho et al.) and U.S. Pat. No. 6,383,644 (Fuchs).

Methods of Making

The manufacture of the paint protection films 100, 200, 300 involves forming two or more layers, as described, that are subsequently coupled to each other. The layers constituting the paint protection films 100, 200, 300 may be prepared in parallel or in series.

The clear coat layer in particular may be formed using conventional techniques known to those of ordinary skill in the art. Such techniques include, for example, coating or extruding onto a substrate. One of skill in the art can coat or extrude the disclosed hardenable clear coat compositions onto a substrate using batch or continuous techniques.

In an exemplary method, prior to coating or extrusion onto a web, the first part of a two-part hardenable composition for the clear coat layer is prepared by first mixing the polyol components with the monohydroxyl acrylic polydimethylsiloxane, a suitable solvent (if needed), and any optional additives. The second part of the two-part hardenable composition contains the isocyanate component along with any solvent or optional additives. The first and second parts are then mixed in appropriate amounts to obtain a desired NCO:OH ratio. The NCO:OH ratio is preferably selected between 0.75 and 1.25. The composition is then coated onto a suitable substrate.

In some embodiments, the mixture of the polyol component and isocyanate component is coated onto a substrate, such as a polyurethane base layer, using conventional equipment such as a knife coater, roll coater, reverse roll coater, notched bar coater, curtain coater, rotogravure coater, or rotary printer. Coatings can be hand spread or automated and may be carried out according to either a batch or continuous process. The viscosity of the composition can be adjusted as needed to suit the type of coater used.

The coated hardenable composition is then dried and, in one embodiment, partially hardened at elevated temperatures. An increasing temperature profile is preferably used to first evaporate the solvent and then partially cure the composition. Where a continuous process is used, these processes can be occur along a moving web. A 0.0076 centimeter (0.003 inch) thick wet coating having a solids content of about 45% wt, for example, could use a temperature profile of 2 minutes at 80° C. followed by 10 minutes at 125° C. In general, the coating compositions are preferably dried and/or hardened in a temperature range from 25° C. to 150° C.

The processing of the clear coat layer during its drying and hardening steps can have a substantial effect on its surface properties.

One consideration in particular relates to the presence of a free surface on the clear coat layer. It is believed, for example, that providing a free surface on the clear coat layer during the hardening reaction induces polydimethylsiloxane functional groups to migrate or reorient at the free surface, thereby imparting the observed stain-resistant properties to the paint protection film. Surprisingly, disposing a clear coat liner (such as clear coat liner 312 in FIG. 3) onto the clear coat layer was observed to significantly impair the functionalization of the free surface. It is therefore preferable that a sufficient time interval elapses between coating the clear coat layer and lamination of the clear coat liner onto the clear coat layer, to allow polydimethylsiloxane functional groups to migrate appreciably to the free surface.

On information and belief, the sufficiency of the time interval between forming the clear coat layer having the free surface and laminating, or otherwise disposing, the clear coat liner onto the free surface results in a substantial concentration gradient of polydimethylsiloxane functional groups near the top surface of the clear coat layer. Such a concentration gradient is defined along the thickness dimension of the paint protection film and can be observed as a difference in the concentration of polydimethylsiloxane functional groups between locations at the top surface of the paint protection film and locations remote from the top surface of the paint protection film where no free surface was present when hardening the clear coat layer.

The thickness of the base layer can vary as needed for the end use. Typically, the paint protection film thickness after hardening is at least 0.05 millimeters, at least 0.075 millimeters, or at least 0.1 millimeters. In some embodiments, the paint protection film thickness after hardening is at most 1.27 millimeters, at most 1.1 millimeters, or at most 1.0 millimeters.

Applications and Properties

The provided articles can be applied to any of a wide variety of substrates. Such substrates may be flat like the paint protection films 100, 200, 300 in FIGS. 1-3, or may have a contour with a compound curvature in three dimensions. When it is desired to adhere these articles to such curved surfaces, it is preferable that the paint protection film has sufficient flexibility to conform to the surface of the substrate without delaminating at the edges or substantially wrinkling.

Common substrates that may be suitable for protection include, for example, bumper facia, pillar posts, rocker panels, wheel covers, door panels, trunk and hood lids, mirror housings, dashboards, floor mats, and door sills. In an exemplary method of application, a paint protection film can be mounted to a suitable substrate by simultaneously peeling away the release liner from the adhesive layer while applying the paint protection film onto the substrate in a single continuous motion.

In some embodiments, the provided paint protection film 100, 200, 300 is applied to the exterior surfaces of automobiles, trucks, motorcycles, trains, airplanes, marine vehicles, and snowmobiles. In alternative embodiments, the paint protection films can be applied to surfaces of structures other than vehicles, such as fixtures, buildings and architectural surfaces. Applications of these paint protection films may be either primarily indoor or outdoor in nature. The provided paint protection films 100, 200, 300 are especially advantageous outdoors not only because of their low surface energy and easy cleaning properties, but because they display excellent adhesion, weathering, chemical and abrasion resistance and resistance to silvering while remaining highly flexible.

In some embodiments, the paint protection film 100, 200, 300 has an exposed top surface. Advantageously, the clear coat layer 202, 302 provides a combination of desirable optical and mechanical properties rendering it especially suitable as an outermost layer in paint protection film applications.

The optical properties of a clear coat layer or paint protection film can be characterized by its measured light transmission and haze values. It is generally desirable to have the lowest haze possible for clear coat applications. Transmission and haze values for clear coat layer samples can be obtained, for example, using a Haze-Gard Plus instrument available from BYK Gardner USA of Columbia, Md. The hardened clear coat layer or paint protection film preferably displays a haze that is less than 6 percent, less than 5 percent, less than 4 percent, less than 3.5 percent, or less than 3 percent, as measured according to the Haze Test as later described in the Examples section.

The hardened clear coat layer 202, 302 also exhibits a stain-resistant, low surface energy surface that tends to repel liquid contaminants, causing them to "bead up" when disposed on the clear coat surface. Since these contaminants do not wet the clear coat surface, cleaning of the protective film is greatly facilitated. The surface energy of the clear coat layer 202, 302 can be experimentally characterized using contact angle measurements. In some embodiments, the hardened composition displays an advancing water contact angle at ambient temperature and pressure that is at least 97 degrees, at least 99 degrees, at least 101 degrees, at least 102 degrees, or at least 103 degrees. In some embodiments, the advancing water contact angle is at most 125 degrees, at most 122 degrees, at most 119 degrees, at most 117 degrees, or at most 116 degrees.

In some embodiments, the hardened composition displays an advancing water contact angle at ambient temperature and pressure ranging from 97 degrees, and in increments of 1 degree up to and including 125 degrees, and any range therebetween (e.g. 100 degrees to 115 degrees).

In some embodiments, the transparent paint protection film has a Young's modulus of less than or equal to 200 MPa, and preferably less than or equal to 120 MPa. In some embodiments, the transparent paint protection film has a Young's modulus of the transparent paint protection film of greater than or equal to 10 MPa.

In some embodiments, the transparent paint protection film has a percent strain of less than or equal to 1.0 according to the Creep Test. In some embodiments, the base layer of the transparent paint protection film is polyurethane and the acrylic adhesive layer has a 180 degree peel adhesion of greater than or equal to 300 N/m and less than or equal to 1300 N/m according to the Peel Test performed for a duration of 1 hour. In some embodiments, the base layer of the transparent paint protection film is polyurethane and the acrylic adhesive layer has a 180 degree peel adhesion of greater than or equal to 500 N/m and less than or equal to 1000 N/m according to the Peel Test performed for a duration of 1 hour. In some embodiments, the base layer of the transparent paint protection film is polyurethane and the acrylic adhesive has 180 degree peel adhesion of greater than or equal to 300 N/m and less than or equal to 1500 N/m according to the Peel Test performed for a duration of 168 hours.

While not intended to be limiting on the present invention, particular exemplary embodiments A-AM are contemplated and described as follows:

Test Methods

Creep Test

The viscoelastic properties of an adhesive can be characterized using a suitable rheometer. A suitable rheometer for evaluating the preferred materials of the present invention include cone and plate or parallel plate rheometers. When operated in a constant shear (e.g. 1 Pa) mode and at a constant normal force (e.g. 1 N), the rheometer is capable of measuring the cold flow or creep properties of an adhesive. The test can be performed over any duration of time (e.g. 1 hr) and optionally followed by a recovery phase (e.g. 30 minutes), during which the shear stress is decreased to zero (e.g. 0 Pa). The % strain on the material during this test and subsequent recovery phase is a good measure of the material's overall cold-flow viscoelastic behavior.

Tensile and Elongation

Film samples measuring 10 mm in width and 200 mm in length were tested for tensile properties using a MTS Sintech load frame with a gap of 100 mm between self-tightening grips and a test speed of 200 mm/min to elongate and break each sample. Three replicates were prepared for each sample and the average was determined. Elongation was determined by the change in length upon elongation of the distance between grips divided by the original length of the grip separation distance. The peak load was recorded as the highest tensile force applied to the film sample resulting in material failure. Finally, Young's Modulus was determined as the slope of the stress vs. strain curve taken over small (0-1%) strain values.

Peel Adhesion Test

Film samples were prepared by laminating the adhesive formulations, coated to a 1.75 mil thickness, onto a carona treated 6.0 mil polyurethane film. Test strips having a size of 10 millimeters (mm) wide and 220 mm long were tested for 180 degree peel adhesion to an APR45860 painted steel panel (obtained from ACT Test Panels LLC; Hillsdale, Mich.). The peel adhesion was determined according to the ASTM Standard Methods of Testing Pressure-Sensitive Adhesive-Coated Tapes Used for Electrical Insulation, ASTM D1000-79, Procedure A. The samples were adhered to the test substrate surfaces using four passes of a 2.1-kilogram (kg) roller. After aging in controlled temperature and humidity conditions (approximately 22 degree C., 50% relative humidity) for approximately 1 hour, the films were tested with a 180 degree peel geometry at 200 millimeters/minute (mm/min) peel rate, unless otherwise noted. Replicate samples were also aged at a controlled temperature of approximately 22 degree C. for approximately 168 hours and tested as above.

Ink Marker and Dry Erase

The paint protection films were tested for stain resistance by applying the paint protection films to a white painted panel to simulate a paint protection film covering an automotive metal panel. The paint protection films were applied with an application fluid consisting of a mixture of water and isopropyl alcohol (75:25) at an application pressure of 30 PSI. Three lines were drawn on the paint protection films using a black SHARPIE permanent ink marking pen. After 3 minutes, the paint protection films were evaluated for their ability to wet out the ink. A paper towel was used to attempt to erase the drawn lines with moderate hand pressure.

Contact Angle

The advancing and receding water contact angles were measured for the clear coat using the procedure described in the technical manual of Drop Shape Analysis System DSA-100 (Kruss, Hamburg, Germany). The measurement system was equipped with a digital camera, automatic liquid dispensers, and sample stages allowing for a hands-free contact angle measurement via automated placement of a drop of water (where the water drop has a size of approximately 5 microliters). The drop shape was captured automatically and then analyzed via Drop Shape Analysis by a computer to determine the advancing, and receding water contact angle.

Haze

The paint protection films were applied onto a transparent 100 micron (0.004 in) polyethylene-terephthalate film with an application fluid consisting of a mixture of water and isopropyl alcohol (75:25) at an application pressure of 207 KPa (30 PSI). The haze values were measured using a Haze-Gard Plus obtained from Byk Gardner USA (Columbia, Md.).

Stain Resistance

The Stain Resistance of the paint protection films were measured according to the color change before and after application of various liquids to the clear coat layer. The paint protection films were applied to a white painted panel with an application fluid consisting of a mixture of water and isopropyl alcohol (75:25) at an application pressure of 207 KPa (30 PSI). The color change was measured before and after application of various staining liquids to the clear coat layer using a CS-5 Chroma Sensor from Datacolor International (Lawrenceville, N.J.). The stain fluids were applied onto the clear coat layers in an approximately 25 micron (1 inch) diameter spot. After 24 hours at room temperature, the stain fluids were cleaned with varnish makers and painters naphtha (VM&P). ΔE, ΔL, Δa, Δb were measured for each sample. Details of the staining fluids are reported in Table 1 below. Test results are reported in Table 2 below.

Rheological Data

Figure 4:
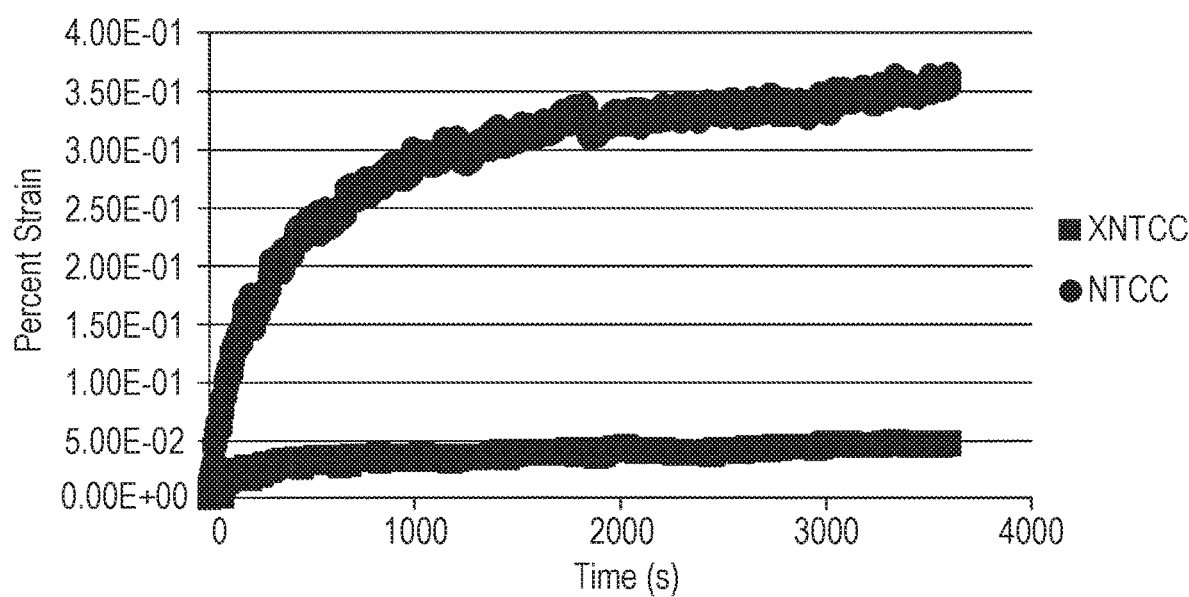
FIG. 4 shows a rheological analysis and creep testing (1 hr at 1 Pa shear stress).

The viscoelastic properties of the adhesives were characterized using an MCR 302 rheometer from Anton Paar GmbH. Measurements were performed using 25 mm stainless steel plates. The rheometer was operated in a constant shear (e.g. 1 Pa) mode and at a constant normal force (e.g. 1 N) to measure the cold flow or creep properties of the adhesives. The test was performed over a duration of one hour. The % strain of the two adhesive formulations is reported in FIG. 4. The XNTCC adhesive formulation exhibited superior cold flow behavior, 0.047% stain, as compared to the NTCC formulation, 0.367%.

EXAMPLES

Two adhesive compositions were prepared, one containing both covalent and ionic crosslinkers (XNTCC) and a second (NTCC) with just the ionic crosslinker. The compositions were coated and characterized rheologically.

Stock Acrylic Adhesive Blend

A stock adhesive was prepared by blending 47% by weight acrylic solids with 48% by weight ethylacetate, 4% by weight isopropanol, and 1% by weight methanol. The acrylic solids were comprised of a mixture of 39% by weight of 2-ethylhexylacrylate (EHA), 55% by weight butyl acrylate (BA) and 6% by weight acrylic acid (AA).

Example 1 (XNTCC)

A transparent paint protection film was prepared by blending a solution of 79.575% by weight of the stock acrylate blend with 0.025% by weight of aluminum acetylacetonate (ionic crosslinker), 0.02% by weight 1,1'-ISOPHTHALOYLBIS(2-METHYLAZIRIDINE) covalent crosslinker, 0.38% by weight toluene and 20% by weight heptane. The blended solution was coated using a conventional slot die onto a polyester (PET) release liner, with a silicone release layer on the side of the liner that was coated with the blended solution. The coated adhesive was dried and cured by placing the coated release liner in a conventional forced air oven using the temperature profile noted in Table 1 and as described below. The dried and cured adhesive coated liner was laminated to a 140 micron (5.5 mil) thick polyurethane film at room temperature using processes and techniques known to those skilled in the art. The final adhesive thickness was 44 microns (1.75 mil), with less than 1% residual solvents. Peel adhesion values are shown in Table 2 below.

Specifically, the adhesive coating was dried and cured in a 120 foot long drying oven, using the drying profile in Table 2, where each drying zone of the oven was approximately 9.144 meters (30 feet) in length. Referring to Table 2, "Top" refers to the temperature above the web and "Bottom" refers to the temperature below the web).

TABLE 1

| Zone | 1 Top | 1 Bottom | 2 Top | 2 Bottom | 3 | 4 |
|---|---|---|---|---|---|---|
| Temp. (C.) | 49 | 49 | 49 | 54 | 74 | 110 |
| Temp. (F.) | 120 | 120 | 120 | 130 | 165 | 230 |

Comparative Example C1 (NTCC)

A transparent paint protection film was prepared as in Example 1 except the covalent crosslinker was not used. Peel adhesion values are shown in Table 2 below.

TABLE 2

| 180 degree peel test | Samples | |
|---|---|---|
|  | Example 1 | Comparative C1 |
| Adhesions (N/m) | | |
| Initial—1 hr | 621.9 | 476.1 |
| Normal—168 hr | 677.7 | 456.2 |

All patents and patent applications mentioned above are hereby expressly incorporated by reference. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the following claims and their equivalents.

What is claimed is:

1. A transparent paint protection film comprising:
a transparent polymeric base layer backed by a transparent acrylic adhesive layer, wherein the acrylic adhesive layer is a pressure sensitive adhesive that is tacky at ambient conditions, wherein the acrylic adhesive layer comprises a first cross-linking agent and a second cross-linking agent different from the first cross-linking agent, wherein the first cross-linking agent comprises a metal ion, and the base layer comprises a polyurethane, polyvinylchloride, polyolefin, or any combination thereof;
the transparent paint protection film further comprising a transparent clear coat layer disposed on a major surface of the base layer that is opposite the surface that is adhered to the adhesive layer,
and further wherein the transparent paint protection film has a Young's modulus of less than or equal to 200 MPa.

2. The transparent paint protection film of claim 1 wherein the Young's modulus of the transparent paint protection film is less than or equal to 120 MPa.

3. The transparent paint protection film of claim 1 wherein the Young's modulus of the transparent paint protection film is greater than or equal to 10 MPa.

4. The transparent paint protection film of claim 1 wherein the metal ion of the first cross-linking agent is an aluminum ion, titanium ion, or a combination thereof.

5. The transparent paint protection film of claim 1 wherein the second cross-linking agent comprises aziridine, isocyanate, peroxide, or any combination thereof.

6. The transparent paint protection film of claim 1 wherein the base layer has a thickness in the range of from at least about 100 microns up to and including about 400 microns.

7. The transparent paint protection film of claim 1 wherein the base layer comprises an aliphatic thermoplastic polyurethane.

8. The transparent paint protection film of claim 1 wherein the adhesive layer has a percent strain of less than or equal to 1.0 according to the Creep Test.

9. The transparent paint protection film of claim 1 wherein the base layer is polyurethane and the acrylic adhesive layer has a 180 degree peel adhesion in the range of from at least about 300 N/m up to and including about 1300 N/m according to the Peel Test performed for a 1 hour duration.

10. The transparent paint protection film of claim 1 wherein the base layer is polyurethane and the acrylic adhesive layer has a 180 degree peel adhesion in the range of from at least about 500 N/m up to and including about 1000 N/m according to the Peel Test performed for a 1 hour duration.

11. The transparent paint protection film of claim 1 wherein the base layer is polyurethane and the acrylic adhesive has 180 degree peel adhesion in the range of from at least about 300 N/m up to and including about 1500 N/m according to the Peel Test performed for a 168 hour duration.

12. The transparent paint protection film of claim 4 wherein the second cross-linking agent comprises aziridine, isocyanate, peroxide, or any combination thereof.

13. The transparent paint protection film of claim 12 wherein the base layer comprises an aliphatic thermoplastic polyurethane.

14. The transparent paint protection film of claim 13 wherein the base layer has a thickness in the range of from at least about 100 microns up to and including about 400 microns.

15. The transparent paint protection film of claim 4 wherein the base layer comprises an aliphatic thermoplastic polyurethane.

16. The transparent paint protection film of claim 4 wherein the base layer has a thickness in the range of from at least about 100 microns up to and including about 400 microns.

17. The transparent paint protection film of claim 12 wherein the base layer has a thickness in the range of from at least about 100 microns up to and including about 400 microns.

18. The transparent paint protection film of claim 5 wherein the base layer comprises an aliphatic thermoplastic polyurethane.

19. The transparent paint protection film of claim 5 wherein the base layer has a thickness in the range of from at least about 100 microns up to and including about 400 microns.

* * * * *